(12) United States Patent
Wu et al.

(10) Patent No.: US 7,645,365 B2
(45) Date of Patent: Jan. 12, 2010

(54) IMAT MODULES WITH SERIAL CONDUCTIVE STRIPES

(75) Inventors: Zhonglin Wu, Bettendorf, IA (US); Tuan Q. Cao, Davenport, IA (US)

(73) Assignee: Carleton Life Support Systems, Inc., Orchard Park, NY (US)

( * ) Notice: Subject to any disclaimer, the term of this patent is extended or adjusted under 35 U.S.C. 154(b) by 579 days.

(21) Appl. No.: 11/306,096

(22) Filed: Dec. 15, 2005

(65) Prior Publication Data

US 2006/0177715 A1   Aug. 10, 2006

Related U.S. Application Data

(60) Provisional application No. 60/593,732, filed on Feb. 9, 2005.

(51) Int. Cl.
*B23H 3/04* (2006.01)
*C25B 11/00* (2006.01)

(52) U.S. Cl. .................... 204/286.1; 204/279; 422/120; 429/30

(58) Field of Classification Search ....................... None
See application file for complete search history.

(56) References Cited

U.S. PATENT DOCUMENTS

| 4,248,941 A | 2/1981 | Louis et al. |
| 5,871,624 A | 2/1999 | Crome ........................ 204/286 |

*Primary Examiner*—Nam X Nguyen
*Assistant Examiner*—Kourtney R Salzman
(74) *Attorney, Agent, or Firm*—Marsteller & Associates, P.C.

(57) ABSTRACT

An ionically conductive ceramic element (20) comprises a plurality of tubes (30) each having interior (24) and exterior (38) surfaces and closed (48) and open (50) ends. A tube support (14) receives open tube ends (50). A first electrically conductive coating (36) is formed on the exterior tube surfaces (38). A second coating (22) is formed on the interior tube surfaces (24). A bottom electrically conductive stripe (16) makes electrical connections between second coatings (22) on the interior tube surfaces (24). A top electrically conductive stripe (40) creates electrical connections between first coatings (36) on the exterior tube surfaces (38). The top and bottom stripes are connected such that at least one stripe (40) on the top is electrically connected to at least one stripe (16) on the bottom.

24 Claims, 3 Drawing Sheets

IMAT MODULES WITH SERIAL CONDUCTIVE STRIPES

CROSS REFERENCE TO RELATED APPLICATIONS

This application claims the benefit of U.S. Provisional Application Ser. No. 60/593,732, filed Feb. 9, 2005, entitled IMAT MODULES WITH SERIAL CONDUCTIVE STRIPES.

BACKGROUND OF THE INVENTION

1. Technical Field

The invention relates to the field of devices for separating oxygen from a more complex gas containing oxygen to deliver the separated oxygen for use. More particularly, the invention relates to solid state electrochemical devices for separating oxygen from a more complex gas.

2. Background Art

The ceramic oxygen generation system, Integrated Manifold and Tube (IMAT), as described in U.S. Pat. No. 5,871,624, has demonstrated the capability of generating high purity oxygen at high pressure. In a typical IMAT, tubes in each row are electrically connected in parallel and each row is electrically connected in series through via wires. Using this approach, the IMATs can be operated at reasonable current and voltage levels as compared to the approach when all tubes are connected in parallel which requires larger current to generate the same amount of oxygen. Further, the via wires are inserted into the via holes on the IMAT bases. To generate oxygen with above ambient pressure, the via wires need to be sealed tightly with the ceramics.

The challenge the prior approach faces is the difficulty associated with sealing via wires and labor time and equipment/materials cost involved with via insertion. Because of the operation temperature (600-750° C.) and the conductivity requirements, only a limited number of metals such as silver (Ag), gold (Au), platinum (Pt), and their alloys can be viable candidates. From a cost standpoint, silver would generally be the best candidate. However, silver has a thermal expansion coefficient that is much larger than that of IMAT ceramics and thus makes the sealing process very challenging due to unavoidable temperature cycling in product manufacturing and application.

While the above cited references introduce and disclose a number of noteworthy advances and technological improvements within the art, none completely fulfills the specific objectives achieved by this invention.

SUMMARY OF THE INVENTION

In accordance with the present invention, an ionically conductive ceramic element comprises a plurality of tubes each having interior and exterior surfaces. Each tube has a closed end and an open end. A tube support member having a top surface and a bottom surface receives open ends of the plurality of tubes. A first electrically conductive coating or current collector is formed on at least the exterior surfaces of the plurality of tubes. A second electrically conductive coating or current collector is also formed on at least the interior surfaces of the plurality of tubes.

At least one bottom electrically conductive stripe is formed on the bottom surface of the tube support member to create electrical connections between two or more selected second electrically conductive coatings or current collector on the interior surfaces of the tubes. At least one top electrically conductive stripe is similarly formed on the top surface of the tube support member to create electrical connections between two or more selected electrically conductive coatings that are on the exterior surfaces of the tubes.

The electrically conductive stripes on the top extend to and over the edges of the tube support member and the electrically conductive stripes on the bottom extend to and over the edges of the tube support member, so that the top stripes and the bottom stripes are connected in such a way that at least one stripe on the top connecting one row of tubes is electrically connected to at least one stripe on the bottom connecting an adjacent row of tubes.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawings and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

FIG. 2a is a back side view of the IMAT portion; FIG. 2b is a front side view of the IMAT; and, FIG. 2c is a side view of the IMAT.

DETAILED DESCRIPTION

Figure 1:
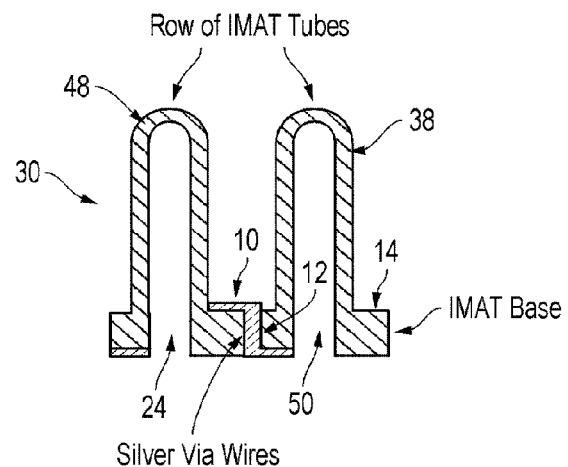
FIG. 1 is a schematic cross-sectional drawing showing the prior art of connecting neighboring rows of IMAT tubes in series using via wires through the IMAT base.

So that the manner in which the above recited features, advantages, and objects of the present invention are attained can be understood in detail, more particular description of the invention, briefly summarized above, may be had by reference to the embodiment thereof that is illustrated in the appended drawings. In all the drawings, identical numbers represent the same elements. The use of terms such as "downwardly", "upwardly", "left", "right", etc. as used herein is only for purposes of convenience of description and these terms should be construed in the relative sense.

The present invention describes an IMAT and a process of forming serial connections from row to row and sealing two IMAT halves to form an IMAT module.

The disclosure of U.S. Pat. No. 5,871,624 is incorporated herein as if fully set forth.

As is known, element 20 is formed having a series of tubes 30 extending from a generally planar tube support member 14. By way of example, in a typical embodiment the tubes 30 may be formed into 7 columns of 9 tubes each, or stated another way, 9 rows of 7 tubes each. The outer end 48 of each tube 30 is closed at the top or tip of the tube 30. The tube support member 14 also receives open ends 50 of the plurality of tubes 30. The outer surfaces 38 of the tubes 30 along with the closed ends 48 thereof, are generally first coated with a catalyzing and electrically conductive material or electrode and then coated with an electrically conductive material or current collector. Likewise, the interiors 24 of each of the tubes 30 are generally first coated with a catalyzing and electrically conductive material or electrode and then coated with an electrically conductive material or current collector.

As schematically shown in FIG. 1, the previous method uses silver wires 10 as vias through openings 12 formed in the IMAT support member or base 14 to create electrical connections. The present invention uses silver stripes 16 to form electrical connections, thereby eliminating the need of via wires 10.

Figure 2A:
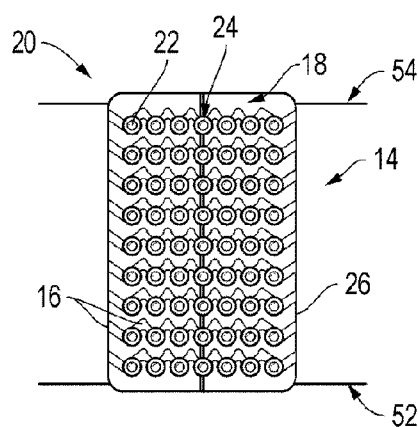
FIGS. 2a through 2c are schematic drawings showing the present invention of connecting rows of IMAT tubes in series using silver stripes around the IMAT edges.

In the present approach, silver stripes 16 are formed on a bottom surface or back side 18 of the tube support member 14 of an IMAT segment or part 20. The silver stripes 16 electrically connect current collector coatings 22 on inside surface 24 of tubes 30 to the stripes 16. The silver stripes 16 preferably electrically connect the electrically conductive coating 22 on the insides 24 of all tubes in a singular or same row with one stripe 16. The stripes 16 are extended all the way to the edges 26 of the IMAT support member or base 14 (FIG. 2a and FIG. 2c).

On the top surface or front side 28 (tube 30 side) of the IMAT segment 20, silver stripe electrical connections 32 are formed at the feet 34 of tubes 30 to establish or make an electrical connection between current collectors 36 coated on or formed on the outside or exterior surface of the tubes 30 and a row bus stripe 40 on the base 14. The electrical connections 32 may be extensions of the stripe 40 or the stripe 40 may overlap or merge with a current collector 36 forming an electrical bond or joint. The electrically conductive coatings 36 for all tubes 30 in a same row are preferably electrically connected to one stripe 40 and each row of tubes preferably has a corresponding stripe 40 associated with it.

Figure 2B:
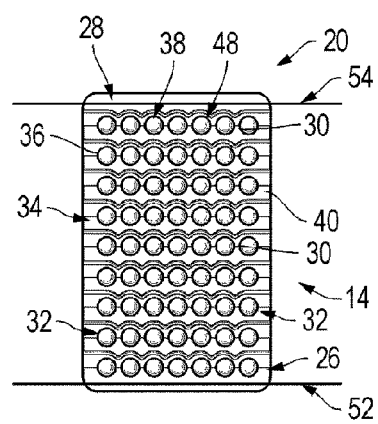
Figure 2C:
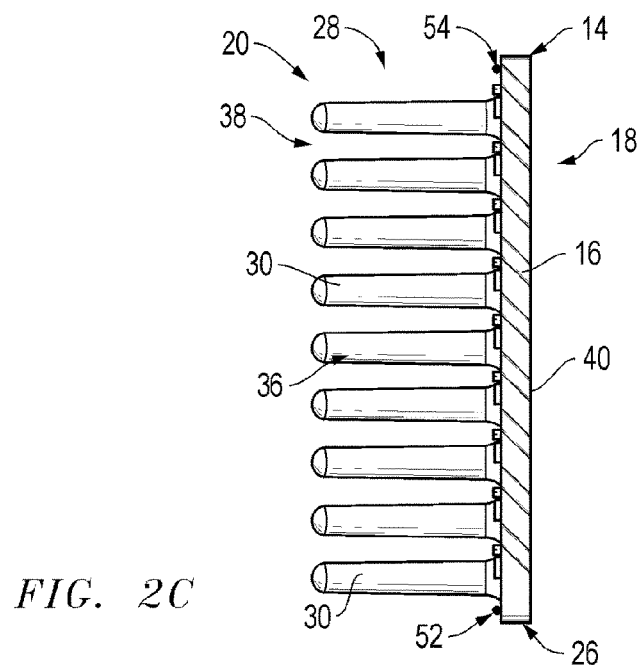

The stripes 40 are extended to and over the edges 26 of the IMAT base 14 (FIG. 2b). The stripes 40 on the tube side 28 of the IMAT segment 20 are electrically connected with the stripes 16 on the back side 18 of the IMAT segment 20 in such a way that each stripe 40 on the front side 28 of the IMAT segment 20 connecting one row is electrically connected to the stripe 16 connecting a neighboring or adjacent row on the back side 18 of the IMAT segment 20 (FIG. 2c). This system of establishing electrical connections between a stripe 40 on the top or front side 28 and an adjacent or neighboring stripe 16 on the back side 18 of the base 14 permits a serial pattern of connections for the current collectors of the IMAT element 20.

A current collector coating 22 on the inside of a single tube 24 is preferably electrically isolated from the current collector coating 22 on the inside of another single tube 24 except through the electrical connection made through the stripes 16. Similarly, a current collector 36 on a single tube 30 is preferably electrically isolated from the current collector 36 on another single tube 30 except through the electrical connection established through the electrically conductive stripes 40.

By way of example, LSCF (lanthanum strontium cobalt ferrite) may be chosen as an electrode material, and silver could be selected for the current collector function.

Electrically conductive wires, such as silver wires, 52 and 54 are attached to both ends of the ceramic element 20 at the front side 28 to allow application of DC voltage to the ceramic element. Silver wire 52 is connected to the current collector coating of the bottom row of tubes (FIG. 2b). Silver wire 54 is connected to the first silver stripe from the top (FIG. 2b).

Figure 3:
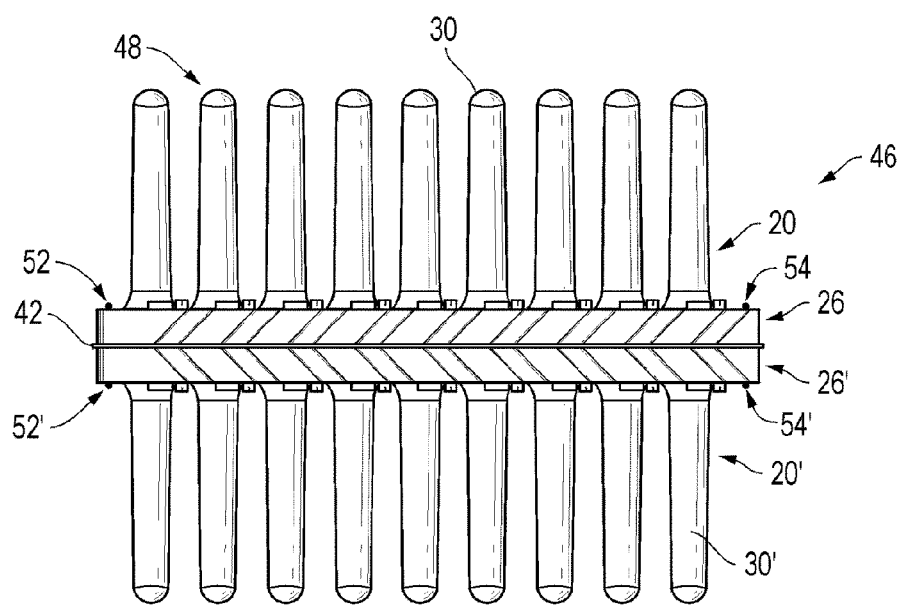
FIG. 3 is a side view of two IMAT segments or portions with both having the stripe-silver connections sealed together with a glass tape.

The symmetry of the modular construction of the ceramic element 20 allows a second element to be inverted and sealed to the first element to form either the oxygen generator or fuel cell assembly. The second element 20' is preferably identical to the first element 20 and identical features are denoted with an apostrophe. Two IMAT segments or parts 20 and 20' both with stripe silver connections are then sealed together with glass using a glass tape or paste 42. This creates or forms the V-shaped or "zebra" pattern of the stripes on the sides of 26 and 26' shown in FIG. 3. The parts 20 and 20' are fired to elevated temperature to form seals 42.

The thickness and width of the silver stripes are determined by the requirement to carry the required current through the stripes with minimal loss due to electrical resistance and the requirement to seal the IMAT parts 20 and 20' together to withstand high pressure and maintain the gas-tightness upon repeated temperature cycling and pressure cycling. The thickness of stripes does not have to be the same; only the portion tightly sandwiched between the IMAT base 14 and the glass seal 42 (when a leak-free seal is required) should be strictly controlled within a certain range to minimize the resistance and the stress. The remaining area of stripes may optionally be thicker to improve the current carrying capability.

Multiple applications of silver stripes onto the IMAT parts 20 may be made to determine the best thickness where the IMAT current is maximized. IMAT segments 20 with desired silver stripe thickness may then be sealed together and can be temperature cycle tested (in combination with pressure cycling) for over 30 cycles with peak pressure over 150 psi at each cycle (self generating oxygen with applied DC voltage at elevated temperatures), by way of example.

Figure 4A:
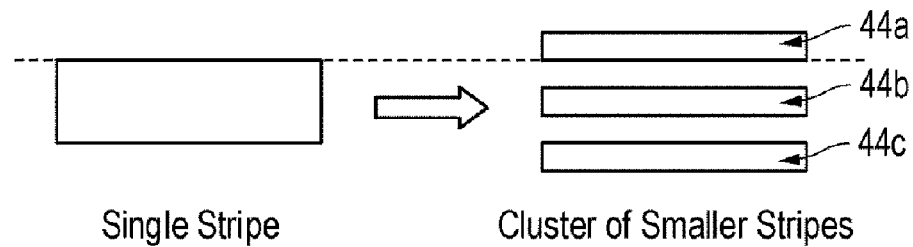
FIG. 4a is a schematic representation of the area of the stripe that is tightly sandwiched between glass seal and IMAT base being split into several smaller stripes to reduce mechanical stress.
Figure 4B:
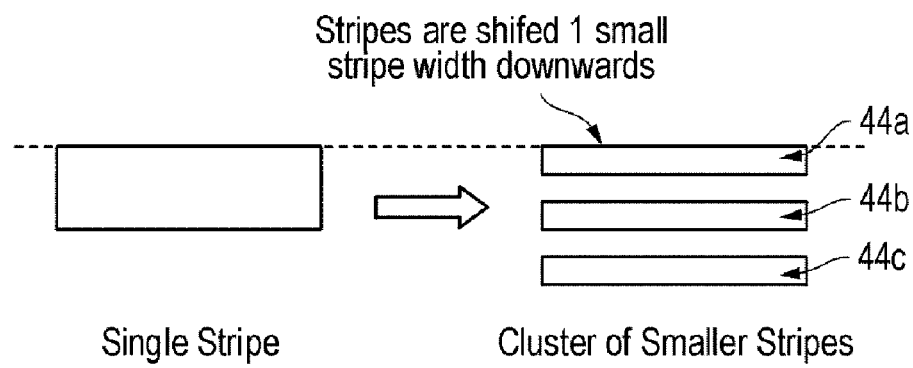
FIG. 4b is a schematic representation of the silver stripe in the corresponding area of the second IMAT portion that will be sealed to the first IMAT with silver stripe showing in FIG. 4a also being split, but moved one width of small stripe downwards along an IMAT edge.
Figure 5:
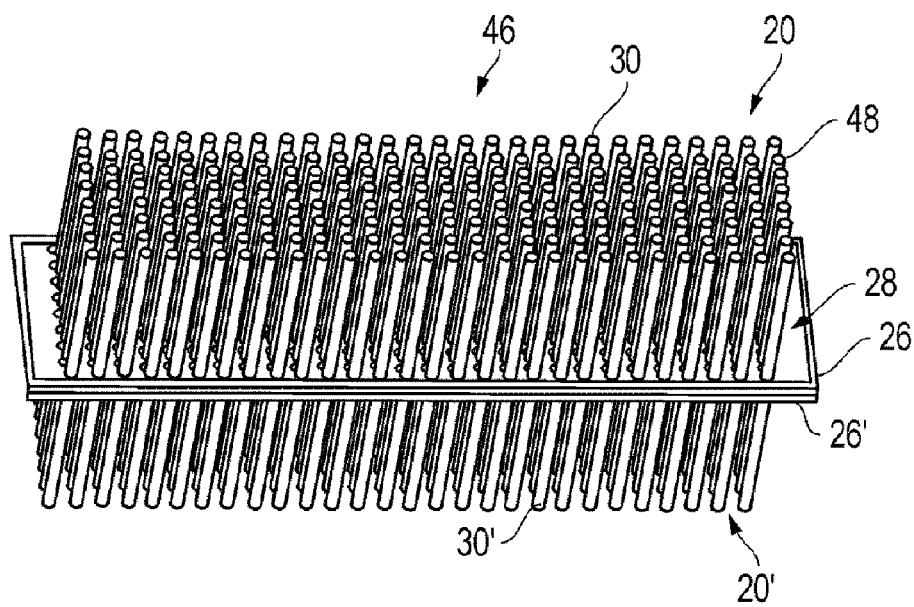
FIG. 5 is a side perspective view of a known IMAT module with 28 columns of 8 tubes each, or stated another way, 8 rows of 28 tubes each.

To further reduce the stress introduced by having silver stripes sandwiched between the glass seal 42 and the IMAT base 14, the area of each stripe tightly sandwiched between glass seal 42 and IMAT base 14 can be further separated into a cluster of smaller stripes 44a-c, as schematically shown in FIG. 4a. To reduce the stress further, the mating part 20' (the second IMAT part 20' seals with the first IMAT part 20 to form a complete IMAT module 46) could have similar cluster of stripes and location of the corresponding cluster can be moved or displaced one small stripe up or down along the IMAT edge 26 (FIG. 4b). Alternatively, stripes can be shifted ½ width on both 20 and 20', but in the opposite directions along the IMAT edge 26.

Alternatively, the locations of stripes at one side of IMAT 20 can be shifted upwardly or downwardly along the IMAT part edge relative to the positions of stripes at the other side of the same IMAT part in order that an IMAT part 20' identical or corresponding to 20 can be inverted and sealed with 20 without overlap of silver stripes at any given location along the IMAT edges 26 and 26'.

While silver may be used for the stripes 16 for example, any electrically conductive material, including metal, metal alloy, ceramics, and composite material, may be used that is appropriately selected for the application to the IMAT module 46. Examples may include gold, platinum, and others. Furthermore, more than one electrically conductive material may be used in the different sections of the same stripe. Particularly, an electrically conductive material having a thermal expansion coefficient closer to that of the ceramics used in the IMAT than silver, such as gold, can be used to form the stripe section which would be sandwiched between glass seal 42 and IMAT base 14 upon bonding two IMAT segments or parts 20 and 20'.

While the above discussions address IMAT parts with two types of coatings, e.g., electrode coating and current collector coating, the electrically conductive stripes approach can also be applied where only one type of coating is used, e.g., a single coating serves as both electrode and current collector. In this situation, stripes 40 are connected to this coating on the tube side and stripes 16 are connected to this coating on the back side.

Method

A method for connecting ionically conductive ceramic elements preferably includes the steps of:

a. forming a plurality of tubes 30 each having interior and exterior surfaces, and each having a closed end and an open end;

b. forming a tube support member 14 for receiving open ends of the plurality of tubes 30; the tube support member 14 having a top surface and a bottom surface;

c. forming a first electrically conductive coating or current collector on the exterior surfaces of a plurality of the tubes 30 (a conductive coating or electrode may be applied to the exterior surfaces of the tubes 30 prior to the application of the current collector coating);

d. forming a second electrically conductive coating or current collector on the interior surfaces of the plurality of tubes 30 generally corresponding to the tubes receiving the conductive coating on the exterior surface (similarly, a second conductive coating or electrode may be applied to the interior surfaces of the tubes 30 prior to the application of the current collector coating);

e. forming at least one bottom electrically conductive stripe 16 on the bottom surface 18 of the tube support member 14 to create electrical connections between two or more selected second electrically conductive coatings on the interior surfaces of the tubes 30;

f. forming at least one top electrically conductive stripe 40 on the top surface 28 of the tube support member 14 to create electrical connections between two or more selected first electrically conductive coatings on the exterior surfaces of the tubes 30;

g. electrically connecting the top stripes 40 and the bottom stripes 16 in such a way that at least one stripe on the top connecting one row of tubes 30 is electrically connected to at least one stripe on the bottom connecting an adjacent row of tubes 30; and, h. inverting a second ceramic element 20' and sealing it with the first ceramic element 20 using glass bonding to form an IMAT module 46.

The foregoing disclosure and description of the invention are illustrative and explanatory thereof, and various changes in the size, shape and materials, as well as in the details of the illustrated construction may be made without departing from the spirit of the invention.

What is claimed is:

1. An ionically conductive ceramic element comprising:
a plurality of tubes each having interior and exterior surfaces, and each having a closed end and an open end;
a tube support member receiving open ends of the plurality of tubes; the tube support member having a top surface and a bottom surface;
a first electrically conductive coating formed on the exterior surfaces of the plurality of tubes;
a second electrically conductive coating formed on the interior surfaces of the plurality of tubes;
at least one bottom electrically conductive stripe formed on the bottom surface of the tube support member to create electrical connections between two or more selected second electrically conductive coatings on the interior surfaces of the tubes;
at least one top electrically conductive stripe formed on the top surface of the tube support member to create electrical connections between two or more selected first electrically conductive coatings on the exterior surfaces of the tubes;
the electrically conductive stripes on the top extend to and over an edge of the tube support member and the electrically conductive stripes on the bottom extend to and over the edge of the tube support member; and
the top stripes and the bottom stripes are electrically connected in promimity to an edge of the tube support member in such a way that at least one stripe on the top connecting one row of tubes is electrically connected to at least one stripe on the bottom connecting an adjacent row of tubes.

2. The ionically conductive ceramic element of claim 1 wherein the top electrically conductive stripe and the bottom electrically conductive stripe are formed from silver or silver alloy.

3. The ionically conductive ceramic element of claim 1 wherein the top electrically conductive stripe and the bottom electrically conductive stripe are formed from electrically conductive materials selected from a group consisting of: silver, gold and platinum.

4. The ionically conductive ceramic element of claim 1 wherein at least one electrically conductive stripe is formed from two or more electrically conductive materials, each in one or more sections of the stripe.

5. The ionically conductive ceramic element of claim 1 wherein at least one electrically conductive stripe has at least one section consisting of a cluster of smaller stripes.

6. The ionically conductive ceramic element of claim 1 wherein symmetry of modular construction of the ceramic element allows a second ceramic element to be inverted and sealed to a first ceramic element to form a component device useful in an oxygen generator or fuel cell assembly.

7. The ionically conductive ceramic element of claim 6 further including a glass bond formed between two complementary formed ionically conductive ceramic elements.

8. The ionically conductive ceramic element of claim 6 wherein the first ceramic element has at least one stripe with at least one section consisting of a cluster of small stripes; the second ceramic element has at least one corresponding stripe with a cluster of small stripes; and the location of the cluster is displaced one small stripe up or down along a ceramic element edge.

9. The ionically conductive ceramic element of claim 6 wherein the first ceramic element has at least one stripe with at least one section consisting of a cluster of small stripes; the second ceramic element has at least one corresponding stripe with a cluster of small stripes; and the location of the cluster is displaced approximately ½ width on both ceramic elements in opposite directions along a ceramic element edge.

10. The ionically conductive ceramic element of claim 6 wherein positions of stripes on one edge of the ceramic element are shifted relative to positions of stripes on another corresponding edge to allow a second identical ceramic element to be inverted and sealed with the first ceramic element without overlapping of silver stripes at the edges where the two elements are sealed.

11. The ionically conductive ceramic element of claim 1 wherein a catalyzing and electrically conductive coating is formed on the exterior surfaces of the plurality of tubes prior to the forming of the first electrically conductive coating.

12. The ionically conductive ceramic element of claim 1 wherein a catalyzing and electrically conductive coating is formed on the interior surfaces of the plurality of tubes prior to the forming of the second electrically conductive coating.

13. A method for connecting ionically conductive cerarmic elements comprising:
    forming a plurality of tubes each having interior and exterior surfaces, and each having a closed end and an open end;
    forming a tube support member for receiving open ends of the plurality of tubes; the tube support member having a top surface and a bottom surface;
    forming a first electrically conductive coating on the exterior surfaces of the plurality of tubes;
    forming a second electrically conductive coating on the interior surfaces of the plurality of tubes;
    forming at least one bottom electrically conductive stripe on the bottom surface of the tube support member to create electrical connections between two or more selected second electrically conductive coatings on the interior surfaces of the tubes;
    forming at least one top electrically conductive stripe on the top surface of the tube support member to create electrical connections between two or more selected first electrically conductive coatings on the exterior surfaces of the tubes; the electrically conductive stripes on the top extending to and over an edge of the tube support member and the electrically conductive stripes on the bottom extending to and over the edge of the tube support member; and,
    electrically connecting the top stripes and the bottom stripes in promimity to an edge of the tube support member in such a way that at least one stripe on the top connecting one row of tubes is electrically connected to at least one stripe on the bottom connecting an adjacent row of tubes.

14. The method of claim 13 wherein the top electrically conductive stripe and the bottom electrically conductive stripe are formed from silver or silver alloy.

15. The method of claim 13 wherein the top electrically conductive stripe and the bottom electrically conductive stripe are formed from electrically conductive materials selected from a group consisting of: silver, gold, and platinum.

16. The method of claim 13 wherein at least one electrically conductive stripe is formed from two or more electrically conductive materials, each in one or more sections of the stripe.

17. The method of claim 13 wherein at least one electrically conductive stripe has at least one section consisting of a cluster of smaller stripes.

18. The method of claim 13 wherein symmetry of modular construction of the ceramic element allows a second ceramic element to be inverted and sealed to a first ceramic element to form a component device useful in an oxygen generator or fuel cell assembly.

19. The method of claim 18 further including a glass bond formed between two complementary formed ionically conductive ceramic elements.

20. The method of claim 13 wherein the first ceramic element has at least one stripe with at least one section consisting of a cluster of small stripes; the second ceramic element has at least one corresponding stripe with a cluster of small stripes; and the location of the cluster is displaced one small stripe up or down along a ceramic element edge.

21. The method of claim 13 wherein the first ceramic element has at least one stripe with at least one section consisting of a cluster of small stripes; the second ceramic element has at least one corresponding stripe with a cluster of small stripes; and the location of the cluster is displaced approximately ½ width on both ceramic elements in opposite directions along a ceramic element edge.

22. The method of claim 18 wherein positions of stripes on one edge of the ceramic element are shifted relative to positions of stripes on another corresponding edge to allow a second identical ceramic element to be inverted and sealed with the first ceramic element without overlapping of silver stripes at the edges where two elements are sealed.

23. The method of claim 13 wherein a catalyzing and electrically conductive coating is formed on the exterior surfaces of the plurality of tubes prior to forming of the first electrically conductive coating.

24. The method of claim 13 wherein a catalyzing and electrically conductive coating is formed on the interior surfaces of the plurality of tubes prior to the forming of the second electrically conductive coating.

* * * * *